Jan. 10, 1961   R. FLÖTGEN   2,967,702
HEATING DEVICE FOR GRANULATED MATERIALS
Filed Feb. 11, 1957

Inventor:
Rudolf FLÖTGEN

By: Toulmin & Toulmin
ATTORNEYS

United States Patent Office 2,967,702
Patented Jan. 10, 1961

2,967,702

HEATING DEVICE FOR GRANULATED MATERIALS

Rudolf Flötgen, Kassel, Germany, assignor to Teldec Telefunken-Decca Schallplatten G.m.b.H., Hamburg, Germany Filed Feb. 11, 1957, Ser. No. 639,400

Claims priority, application Germany Feb. 10, 1956

6 Claims. (Cl. 263—40)

This invention relates to a heating device for granulated materials, and in particular for granulated plastic materials for the manufacture of phonograph discs.

It is the object of my invention to provide a heating device in particular for the purpose of preliminary heating of granulated materials in the manufacture of phonograph discs, which device has a relatively low heat capacity, requires a short starting period to raise the temperature of the device to the desired level, guarantees a satisfactory utilization coefficient, and avoids deterioration of the heated material by excessive long heating and local overheating and decomposition of portions thereof.

Phonograph discs are at present manufactured from thermoplastic material in granulated form, by preliminary heating of the amount of granulated material required for each disc, in ovens having a heating chamber to which heat is applied from the outside by electric resistance heaters, gas burners or steam. The pre-heated mass is then molded in conventional heat-molding devices.

In order to make the amounts of heated material required for an individual disc of a certain size available to the operator of the molding device, the conventional oven is subdivided into several heating chambers which are, for instance, arranged in a revolving oven.

At determined intervals a granulated mass preferably baked together to form a cake ready to be placed in a mold, is entered in a chamber in the oven, passes through a heating period, and is then held in readiness for being taken up by the operator of the pressure mold, at the exit of the oven chamber.

These known ovens for preliminary heating of phonograph disc materials suffer from a number of drawbacks which disadvantageously influence the manufacturing process of the discs. The ovens possess a relatively high heat capacity and thus consume an unwarrantedly high amount of fuel or electric power; they also require an unduly long time for starting operations by heating them up to a desired temperature level.

Furthermore, the granulate portions in the several oven chambers absorb heat in varying amounts and not uniformly. While the bottom portions of cakes where the latter rest on the chamber bottom, are relatively strongly heated by contact heat transfer through the bottom wall of the chamber, the grains in the interior of the granulate cakes receive relatively little heat.

Apart from the fact, that these known oven constructions utilize the heat only with a low uitlization coefficient, an excessively long thermic treatment of the cakes is liable to deteriorate the quality of the material. This is particularly the case in those portions of the cake which are in direct contact with the heated chamber bottom or wall, where local overheating may lead to a decomposition of the thermoplastic material of the cake at the spot in question.

The above-stated object is obtained, and the aforesaid drawbacks avoided by the heating device according to my invention, which device comprises a receptacle for the cakes of granulated material, in which these cakes are pre-heated by direct contact with a current of hot gases passed through the receptacle.

According to one feature of my invention, I use cup means filled with the amount of granulated mass required, for instance, for a single phonograph disc, which cup means can be placed in the aforesaid heating receptacle besides or above each other. These cup means are preferably made of materials having a low heat capacity, i.e. non-metallic materials such as, for instance, plastic materials which are sufficiently heat resistant to remain intact at a temperature range of from 100 to 120° C., at which temperatures the cakes being pre-heated will be hot enough for the subsequent pressure molding step.

The plastic cups are preferably provided with perforated bottom walls, so that the hot gases can easily pass through the perforations in the cup bottom.

According to a preferred embodiment of the heating device according to the invention, I arrange several of these cups one above the other each filled with a determined amount of granulated mass, in a vertically disposed tubular heating receptacle or "oven." Preferably the cups or at least the bottom cup, are held by resilient spring means provided in the interior wall of the tubular oven, and engaging in corresonding holding means, for instance, single recesses or peripheral grooves, or snap hooks and the like, on the outside wall of each cup.

The invention will be further described in detail in connection with the accompanying drawing in which.

Figure 1:
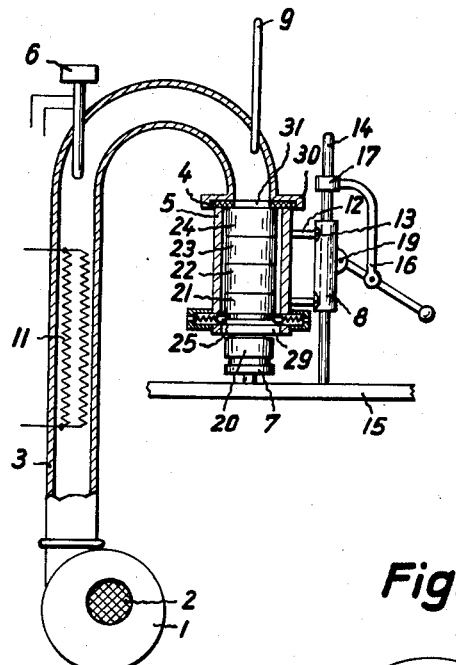
Figure 1 is a partially sectional front view of a preferred embodiment of the heating depice according to the invention.
Figure 2:
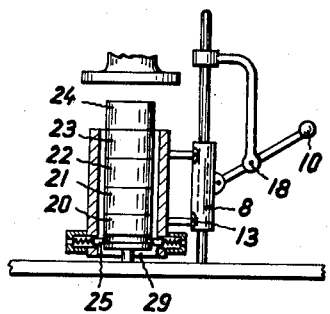
Figure 2 shows in a partial view of Figure 1, the tubular oven of the heating device in a different operational position.

Referring now to the drawings more in detail and in particular to Figure 1, the heating device, according to the invention, comprises a fan 1 operated by a motor (not shown) which suctions in air through a screen filter 2 and blows the air into a tube 3 in which the air is heated, for instance, by electric resistance means 11. The temperature of the air is controlled by thermostat 6 which regulates the electrical heating means 11 in a known manner. Tube 3 has the shape of an inverted U and opens at 4 into the tubular oven 5 which is fitted against the rim of opening 4. In the descending portion of the tube 3 toward the oven 5, there may be arranged a further control thermometer 9, which may also be adapted to regulating heating by resistance means 11. Tubular oven is mounted detachably, for instance, by means of hooks 12 or the like in corresponding receiving means 13 in a sleeve 8 which is slidably fitted on a supporting rod 14 of stand 15. A hook-shaped fulcrum arm 16 is rigidly fastened on rod 14 at 17 and bears at its lower end a pin 18 on which lever 10 is pivotably mounted. This lever 10 is hingedly fastened to sleeve 8 at 19. Hook-shaped arm 16 is preferably resilient and urges lever 10 with its end at 19 against rod 14, so that the lever 10 and sleeve 8 attached thereto can be shifted by a kind of snap action from the position illustrated in Figure 1 to that of Figure 2 and vice versa. Of course, this snap action arrangement may also be replaced by any other conventional means for transferring the oven 5 from one of these two end positions to the other. Oven 5 is transferred from a position in contact with heating tube 3 as shown in Figure 1 to the position removed from opening 4 of tube 3, as shown in Figure 2, by raising or lowering the free end of lever 10.

Figure 3:
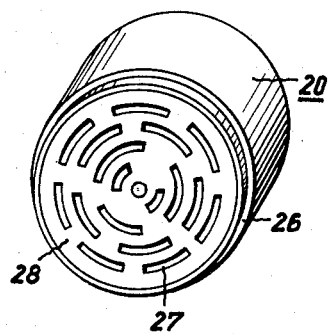
Figure 3 illustrates, in perspective view, a cup to be filled with granulated material.

In the position shown in Figure 1, oven 5 which is held in tight fit against the opening of tube 3 under pressure from arm 16, is filled with a number of superimposed cups 21, 22, 23, 24, each of which contains a determined amount of granulated thermoplastic material, these stacked cups themselves forming a continuous tubular unit having a substantially fluid-tight wall. The lowermost cup in the oven designated in Figure 1 by 21, is held in the oven 5 by resilient snap means 25 provided in the interior wall of the oven tube, and engaging a peripheral groove 26 provided about the cup wall as shown in Figure 3.

Hot air is blown through pipe 3 and passes through opening 4 into oven 5 and the top cup 24 from where it is pressed downwardly through slots 27 provided in the cup bottom 28. From cup 24 the hot air is pressed down past the grains of the material therein heating the entire granulated mass uniformly and under satisfactory utilization of the heat available from the hot air, until the later finally leaves the bottom opening 29 of oven 5.

During the heating of cups 21 to 24 in oven 5, a further cup 20 which has been newly filled with granulated material is already in readiness on table 7 for introduction into the oven.

After the heating of top cup 24 is completed, which usually requires from 3 to 5 minutes, the oven 5 is lowered by raising the free end of lever 10. Thereby snap means 25 snap out of the groove of cup 21 and into the groove of cup 20 on table 7.

At the same time, heated cup 24 appears above the upper end of oven 5 and can be removed immediately by the operator and placed in a mold for pressing.

The oven 5 can then be raised with the new cup 20 in lowermost position in the interior of the oven, the upper oven rim is pressed by the action of arm 16 against the sealing means 31 in flange 30, and the heating process can be repeated.

Cup 24 which will have been emptied into the mold, can be refilled and placed anew on table 7.

Filling of the cups with new granules and removal of the top cups after heating, as well as the raising and lowering of the oven synchronously therewith, can be carried out automatically by providing corresponding mechanisms known per se.

The size of the cups and the inner diameter of the oven 5 can be varied according to the amount of granulated mass required for each article to be pressure-molded. Oven 5 can be easily replaced by an oven of wider or smaller diameter by lifting it out of sleeve 8.

The contact surface flange 30 about the mouth 4 of tube 3 must, of course, be dimensioned to the widest diameter of an oven to be used, or the flange must be provided detachably, for instance, by screen means (not shown) and can be displaced by a flange having a wider rim.

It has also been found advantageous to provide the perforations 27 in bottom 28 of the cups in the form of concentrically arranged slots as shown in Figure 3.

The heating device, according to the invention, can, of course, be used for heating determined portions of granulated plastic material and the like in the manufacture of a great variety of plastic articles, and is not limited to the manufacture of phonograph discs.

The above-described arrangement of oven and cups according to the invention offers special advantages over the present art.

A relatively low amount of heat is required for heating up the granulate to the desired temperature. Also, since granulate-containing cups and hot gases move counter-currently the oven 5, a good utilization of the heat from the hot gasses is achieved, energy consumption for heating in the arrangement according to the invention being only approximately one eighth of the amount of energy required in the conventional heating devices.

The granulate is only subjected to the effect of heat for a short period, and heat is uniformly transmitted to the material in the cups since the hot gas current is blown through the interior of the granulated mass and transfers its heat to the individual grains even in the interior of the cake.

The superimposed cups having perforated bottoms facilitate the flow of hot gases, exploit the heat therefrom with a high utilization coefficient and permit to avoid overheating of the thermoplastic material.

The oven wall is also preferably surrounded, or consists of, a heat resistant plastic mantle such as plastic impregnated fibrous material, so-called hard plastic paper, for instance, described in DIN 7735 (German Industrial Standards), and the like, which material has a very low heat capacity, so that much less heat is consumed for heating up the oven when starting operation of the heating device according to the invention, than is the case in conventional devices.

It will be understood that this invention is susceptible to modification in order to adapt it to different usages and conditions and, accordingly, it is desired to comprehend such modifications within this invention as may fall within the scope of the appended claims.

What I claim is:

1. A heating device for heating granular material, comprising in combination, gaseous heating medium supply means including a delivery conduit having an open end portion; a support; a tubular member having opposite open ends and mounted on said support for movement relative thereto between two positions; tubular receptacle means arranged in and supported by said tubular member, extending in the direction thereof, and adapted to contain granular material to be heated, said receptacle means having a mouth portion and being formed with separable gas-permeable wall means arranged transversely to the axis of said receptacle means and extending across the entire interior cross-section thereof; and moving means for moving said tubular member, together with said receptacle means, into and out of a position wherein said mouth portion of said receptacle means is in substantially fluid-tight engagement with said open end portion of said delivery conduit, whereby when said tubular member is in said position thereof, a gaseous heating medium emanating from said open end of said delivery conduit is passed in its entirety through granulated material in said receptacle means.

2. A heating device for heating granulated material, comprising in combination, gaseous heating medium supply means including a delivery conduit having a downwardly opening end portion; a support; a substantially vertically disposed tubular member having upper and lower open ends and mounted on said support for movement relative thereto in axial direction between upper and lower positions; a plurality of stacked, substantially cup-shaped receptacles arranged in and supported by said tubular member and adapted to contain granular material to be heated, each of said receptacles having a gas-permeable bottom and an annular side wall with all of said stacked receptacles forming a vertically disposed continuous tubular unit which has a substantially fluid-tight side wall, said tubular unit having at its upper end a mouth portion constituted by the mouth portion of the uppermost of said stacked receptacles; and moving means for moving said tubular member, together with said tubular unit, into and out of said upper position wherein said mouth portion of said unit is in substantially fluid-tight engagement with said downwardly opening end portion of said delivery conduit, a gaseous heating medium emanating from said open end of said delivery conduit is passed in its entirety through granulated material in said stacked receptacles.

3. A heating device for heating granulated material, comprising in combination, gaseous heating medium means including a delivery conduit having a downwardly opening end portion; a support; a substantially vertically disposed tubular member having upper and lower open ends and mounted on said support for movement relative thereto in axial direction between upper and lower positions; a plurality of stacked, substantially cup-shaped receptacles each being arranged in said tubular member for axial movement relative thereto and adapted to contain granular material to be heated, each of said receptacles having a gas-permeable bottom and an annular side wall with all of said stacked receptacles forming a vertically disposed continuous tubular unit which has a substantially fluid-tight side wall, said tubular unit having at its upper end a mouth portion constituted by the mouth portion of the uppermost of said stacked receptacles; retaining means for preventing downward movement of said stacked receptacles relative to said tubular member; and moving means for moving said tubular member, together with said tubular unit, into and out of said upper position wherein said mouth portion of said unit is in substantially fluid-tight engagement with said downwardly opening end portion of said delivery conduit, whereby when said tubular member is in said upper position thereof, a gaseous heating medium emanating from said open end of said delivery conduit is passed in its entirety through granulated material in said stacked receptacles.

4. A heating device as defined in claim 3, wherein said retaining means are yielding means for permitting the individual insertion of additional cup-shaped receptacles into said tubular member through said lower open end thereof and for thereafter preventing the downward movement of the stack of receptacles which then includes each newly inserted receptacle, whereby each newly inserted receptacle will at first be minimally heated but will be heated more as it occupies successively higher positions in said stack until it becomes the uppermost receptacle whereupon it will be heated to maximum temperature.

5. A heating device as defined in claim 4 wherein said upper and lower positions are spaced from each other a distance which is greater than the axial height of one of said receptacles, and wherein support means are provided for supporting an additional cup-shaped receptacle to be inserted into said tubular member, said support means being arranged below said lower open end of said tubular member and being spaced from said open end of said delivery conduit, in vertical direction, a distance which is greater than the axial length of said tubular member plus the axial height of one of said receptacles, whereby when said tubular member is moved from its upper position to its lower position while an additional cup-shaped receptacle is supported on said support means, the lowermost of the receptacles already in said tubular member will be engaged by said additional receptacle so that upon continued downward movement of said tubular member over said additional receptacle, the uppermost of the receptacles in said tubular member will emerge from said upper open end thereof.

6. A heating device for heating granulated material, comprising in combination: gaseous heating medium supply means including a delivery conduit having an open end portion; a support; a tubular member having opposite open ends and mounted on said support for movement relative thereto in axial direction between two positions; a plurality of stacked substantially cup-shaped receptacles arranged in said tubular member and adapted to contain granular material to be heated, each of said receptacles having a gas-permeable bottom and an annular side wall; all of said stacked receptacles forming a continuous tubular unit which extends in the direction of said tubular member, and said tubular unit having a substantially fluid-tight side wall, and a mouth portion constituted by the mouth portion of the receptacle arranged at the head of the stack; and movement means for moving said tubular member, together with said tubular unit, into and out of a position wherein said mouth portion of said unit is in a substantially fluid-tight engagement with said open end portion of said delivery conduit, whereby when said tubular member is in said position, a gaseous heating medium emanating from said open end of said delivery conduit is passed in its entirety through granulated material in said receptacle.

References Cited in the file of this patent

UNITED STATES PATENTS

| 208,925 | Powers | Oct. 15, 1878 |
| 821,591 | Holmes et al. | May 22, 1906 |
| 1,080,198 | Cooke | Dec. 2, 1913 |
| 1,144,066 | Roitzheim | June 22, 1915 |
| 1,695,224 | Besta | Dec. 11, 1928 |
| 2,214,421 | Kneass | Sept. 10, 1940 |

FOREIGN PATENTS

| 32,543 | Norway | June 20, 1921 |